(12) United States Patent
Jongsma et al.

(10) Patent No.: US 11,909,426 B2
(45) Date of Patent: Feb. 20, 2024

(54) WAVE-SHAPING FOR OVER- AND UNDERSHOOT PREVENTION

(71) Applicant: Renesas Design Austria GmbH, Graz-Liebenau (AT)

(72) Inventors: Jakob Jongsma, Graz (AT); Michael Pieber, Graz (AT)

(73) Assignee: Renesas Design Austria GmbH, Graz-Liebenau (AT)

( * ) Notice: Subject to any disclaimer, the term of this patent is extended or adjusted under 35 U.S.C. 154(b) by 22 days.

(21) Appl. No.: 17/502,881

(22) Filed: Oct. 15, 2021

(65) Prior Publication Data

US 2022/0190792 A1   Jun. 16, 2022

(30) Foreign Application Priority Data

Dec. 10, 2020  (EP) .................... 20213183

(51) Int. Cl.
*H04B 1/04* (2006.01)
*H01Q 1/22* (2006.01)
*H04B 5/00* (2006.01)

(52) U.S. Cl.
CPC ............. *H04B 1/04* (2013.01); *H01Q 1/2208* (2013.01); *H04B 5/0031* (2013.01); *H04B 5/0062* (2013.01)

(58) Field of Classification Search
CPC ...... H04B 1/04; H04B 5/0031; H04B 5/0062; H04B 5/0081; H04B 1/0475; H01Q 1/2208
USPC ...................................... 455/41.1
See application file for complete search history.

(56) References Cited

U.S. PATENT DOCUMENTS

| 9,654,181 | B1 | 5/2017 | Wobak et al. |
| 10,170,287 | B1 * | 1/2019 | Wu .................. H01J 37/32944 |
| 2008/0136704 | A1 * | 6/2008 | Chan ..................... G01S 7/282 |
| | | | 342/201 |

(Continued)

FOREIGN PATENT DOCUMENTS

| EP | 3182585 A1 | 6/2017 |
| WO | 2005/125144 A1 | 12/2005 |

OTHER PUBLICATIONS

NFC Forum, "Analog", Technical Specification Version 2.1, Feb. 20, 2020, specifically Paragraph 5.7.2.2 of Document, 110 pages.

(Continued)

*Primary Examiner* — Eugene Yun
(74) *Attorney, Agent, or Firm* — MERCHANT & GOULD P.C.

(57) ABSTRACT

A transmitter (1; 21) to transmit an amplitude modulated data signal (2) in an RF-Field (3) over the air to a receiver (4) of an RFID communication system (5; 22) which transmitter (1; 21) comprises:
a wave generator (6) to generate a carrier signal (7) with a particular frequency and waveform;
a modulation stage (15) to modulate the carrier signal (7) in relation to a data signal to be transmitted;
an antenna (11) connected to the modulation stage (15) or wave generator (6) via an amplifier (9) and a matching circuit (10) to transmit the amplitude modulated data signal (2) in the RF-Field (3) over the air,
characterized in that the transmitter (1; 21) furthermore comprises:
a shape stage (16) connected to the wave generator (6) to select the waveform of the carrier signal (7) depending directly or indirectly on the data signal.

18 Claims, 3 Drawing Sheets

(56) References Cited

U.S. PATENT DOCUMENTS

2014/0004794 A1    1/2014  Contaldo et al.

OTHER PUBLICATIONS

European Extended Search Report in Application 20213183.5, dated May 21, 2021, 8 pages.

* cited by examiner

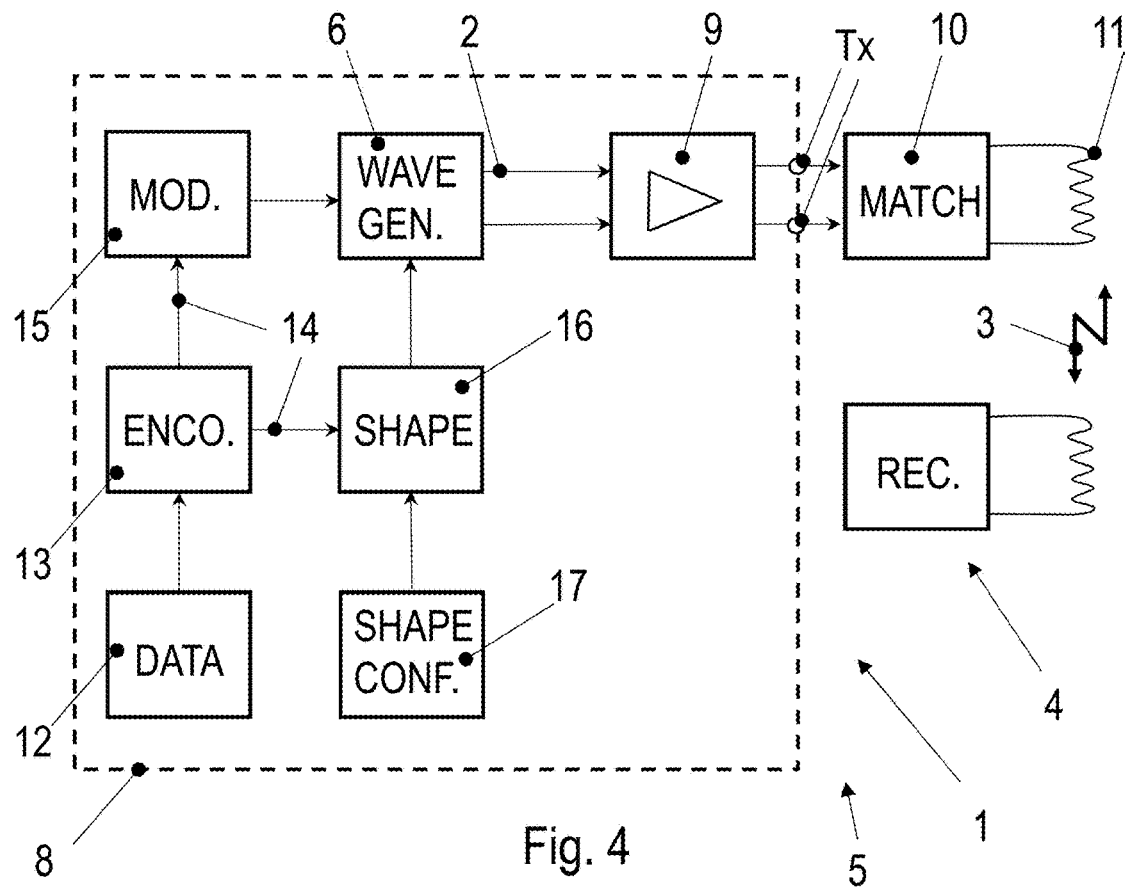
Fig. 4
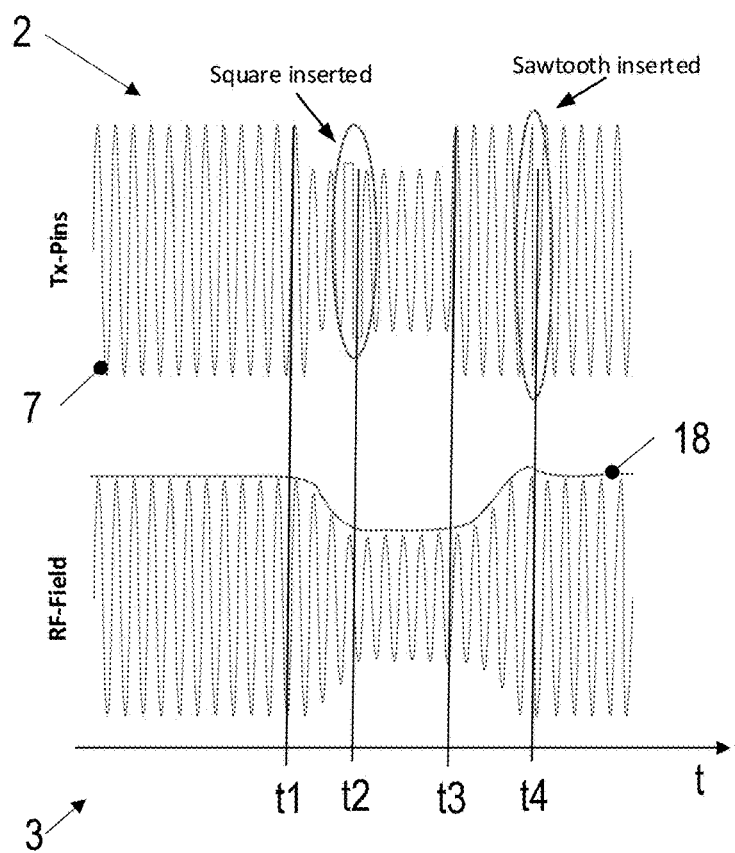
Fig. 5A
Fig. 5B

WAVE-SHAPING FOR OVER- AND UNDERSHOOT PREVENTION

CROSS-REFERENCE TO RELATED APPLICATIONS

This application is claims benefit of European Patent Application No. 20213183.5, filed 10 Dec. 2020, and which application is incorporated herein by reference. To the extent appropriate, a claim of priority is made to the above-disclosed application.

FIELD OF THE INVENTION

The present invention relates to a transmitter to transmit an amplitude modulated data signal in an RF-Field over the air to a receiver of an RFID communication system which transmitter comprises:
 a wave generator to generate a carrier signal with a particular frequency and waveform;
 a modulation stage to modulate the carrier signal in relation to a data signal to be transmitted;
 an antenna connected to the modulation stage or wave generator via an amplifier and a matching circuit to transmit the amplitude modulated data signal in the RF-Field over the air.

BACKGROUND OF THE INVENTION

Known Radio Frequency IDentification communication systems use integrated circuits like ST25R3916 in RFID readers or transmitters to communicate with active or passive transponders. In a typical application, a passive transponder or tag stores product identification of a product to which it is attached and the reader is used to obtain this product information. The reader is powered and generates a magnetic RF-Field emitted by its antenna. When the reader and the tag are within close proximity of each other, the reader generated RF-Field is induced into the antenna of the tag and used to power the passive tag. The tag also has a transceiver to receive the signal from the reader and to transmit a response back to the reader.

There are standards like ISO/IEC18000-3 or ISO/IEC 14.443 Type A and B or ISO15.693 or ECMA-340 13.56 MHz Near Field Communication (NFC) or the NFC Forum or company standards like Felica from company Sony that define protocols and types of modulation used to transmit information between the tag and the reader. Some or all of these standards define, to use an amplitude modulation to transmit an amplitude modulated data signal with digital data within the RF-Field over the air to the tag. ISO14.443 Type A for instance furthermore defines to use a modified Miller encoding to encode the data signal into an encoded data signal for the transmission.

NFC communication system have been applied to more and more different applications. Many of these systems have disadvantageous conditions like a nearby PCD-board, metal case and alike, which can have negative effects on the modulation shape of the amplitude modulated data signal in the RF-Field. FIGS. 1 to 3 show examples of such negative effects. FIG. 1A shows one example of an amplitude modulated data signal on Tx-Pins of a state of the art transmitter which Tx-Pins are connected via an amplifier and matching circuit to the antenna to generate the RF-Field. FIG. 1B shows the RF-Field nearby the antenna of the transmitter. A rising edge of the envelope of the RF-Field shows an overshoot of the maximal amplitude of the carrier signal what can lead to non-compliance of a standard or even to failure of the communication between the transmitter and the receiver. FIG. 2A shows another example of a 10% ASK amplitude modulated data signal on the Tx-Pins of a state of the art transmitter what leads to an undershoot at the end of the falling edge of the envelope of the RF-Field and an overshoot at the end of the rising edge of the envelope of the RF-Field. FIG. 3A shows another example of a 100% amplitude modulated data signal on the Tx-Pins of a state of the art transmitter what leads to an effect called "ringing" at the end of the rising edge of the envelope of the RF-Field. Another such negative effect is called "humps", when the decrease of the falling edge or the rising of rising edge of the envelope of the RF-Field is not monotonically. This effect for instance is described in paragraph 5.7.2.2. of the document "Analog Technical Specification", Version 2.1 of the NFC Forum.

To solve these problematic negative effects in the RF-Field, the transmitter that comprises the integrated circuit ST25R3916 dynamically changes the transmitter voltage for the carrier signal between different levels. In case an overshoot should be avoided, the transmitter voltage is dynamically changed while the modulation edges during a time frame of the rising edge of the envelope of the RF-Field. This solution has the disadvantage that different supply voltages must be present within the integrated circuit and switching between these voltages must be done. This requires several supplies. Otherwise the regulator needs to change its output voltage very fast.

Another known solution to solve this problematic overshoot in the RF-Field realized in other transmitters is to adapt the antenna characteristic dynamically by de-tuning the antenna by changing the Q-factor with a controllable resistor change. This solution is described in U.S. Pat. No. 9,654,181 B1 and has the disadvantage that de-tuning of the antenna changes the antenna characteristic, which changes the complete antenna system behavior. This might result in a reduced communication range and the risk to loose communication between the transmitter and the tag before the relevant information could be exchanged. Consequently, any adaptive control must be applied very carefully to not create the opposite effect.

SUMMARY OF THE INVENTION

It is an object of the invention to provide a transmitter with reduced complexity and a wide communication range and good stability of the communication with a receiver.

This object is achieved with a transmitter that furthermore comprises: a shape stage connected to the wave generator to select the waveform of the carrier signal depending directly or indirectly on the data signal.

This shape stage is built to receive the data signal or the encoded data signal at the same time as the modulation stage receives it and therefore knows when the rising edge or the falling edge of the amplitude modulated data signal will occur. Based on this knowledge the shape stage dynamically selects another waveform of the carrier signal to be generated by the wave generator with a higher or a lower energy content for a limited period of time to avoid an overshoot or undershoot or other problematic negative effects in the RF-Field maybe caused by a disturbing object in the RF-Field. The energy content of a wave is related to the area included in or below the wave. If for instance the general waveform of the carrier signal generated by the wave generator is a sinus wave and an overshoot at the end of the rising edge in the envelope of the RF-Field should be avoided, then the shape stage switches the wave generator for one or a few waves from the sinus wave to a sawtooth wave or a triangular wave. As the energy content of a sawtooth wave or a triangular wave with the same frequency and amplitude as the sinus wave is lower than the energy content of the sinus wave, this one or these few waves with a lower energy content at the right time help to reduce or avoid an overshoot of the envelope of the RF-Field.

These and other aspects of the invention will be apparent from and elucidated with reference to the embodiments described hereinafter. The person skilled in the art will understand that various embodiments may be combined.

BRIEF DESCRIPTION OF THE DRAWINGS

FIG. 4 shows a first embodiment of a transmitter to transmit an amplitude modulated data signal according to the invention.

FIG. 5A shows a 10% ASK amplitude modulated data signal on Tx-Pins of the transmitter shown in FIG. 4 with one square wave inserted to avoid the undershoot and with one sawtooth wave inserted to avoid the overshoot in the envelope of the RF-Field as shown in FIG. 5B.

DETAILED DESCRIPTION OF EMBODIMENTS

Figure 1A:
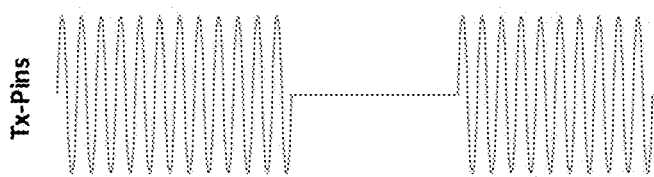
FIG. 1A shows one example of a 100% amplitude modulated data signal on Tx-Pins of a state of the art transmitter which Tx-Pins are connected via an amplifier and matching circuit to the antenna to generate an RF-Field.
Figure 1B:
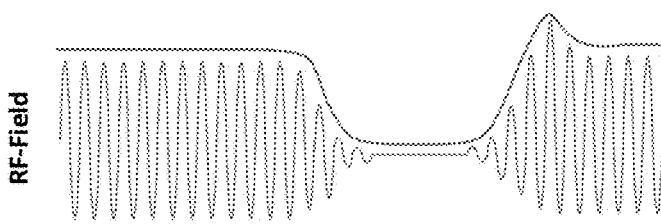
FIG. 1B shows the RF-Field nearby the antenna of the transmitter for the amplitude modulated data signal of FIG. 1A with an overshoot of the rising edge of the envelope of the RF-Field.

FIG. 4 shows a transmitter 1 to transmit an amplitude modulated data signal 2 in an RF-Field 3 over the air to a receiver 4 of an RFID communication system 5 according to a first embodiment of the invention. The transmitter 1 comprises a wave generator 6 to generate a carrier signal 7 with a particular frequency and waveform. The RFID communication system 5 complies to the NFC Standard ISO 18.092 which defines a resonance frequency of the carrier signal 7 of 13.56 MHz with the waveform of a sinus. The RFID communication system 5 furthermore complies to ISO/IEC 14.443 Type A and B or ISO15.693 or ECMA-340 13.56 MHz. The wave generator 6 is realized in an integrated circuit 8 of transmitter 1 and provides the amplitude modulated data signal 2 via an amplifier 9 at Tx-Pins Tx of the integrated circuit 8. A matching circuit 10 is connected to the Tx-Pins Tx and matches the impedances to an antenna 11. The matching circuit 10 and the antenna 11 are arranged to transmit the amplified amplitude modulated data signal 2 in resonance to the close-by receiver 4 that could be realized as passive or active tag or any other active device like e.g. a mobile phone.

A data stage 12 of the integrated circuit 8 stores digital data to be transmitted to the receiver 4. As defined in the NFC Standard a modified Miller encoding has to be processed to encode the data signal of the digital data in an encoder stage 13, which provides an encoded data signal 14 to a modulation stage 15. The modulation stage 15 is built to steer the amplitude of the carrier signal 7 generated by the wave generator 6 to achieve a 10% Amplitude Shift Keying ASK modulation of the encoded data signal 14 to provide the amplitude modulated data signal 2 at the Tx-Pins Tx of the integrated circuit 8. In other embodiments of the invention a 50% or 100% ASK modulation or any other modulation or any other coding known to the man skilled in the art could be used.

Figure 2A:
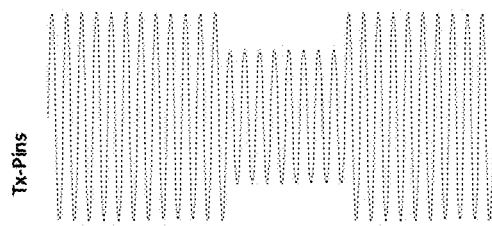
FIG. 2A shows another example of a 10% ASK amplitude modulated data signal on Tx-Pins of a state of the art transmitter which Tx-Pins are connected via a matching circuit to the antenna to generate an RF-Field.
Figure 2B:
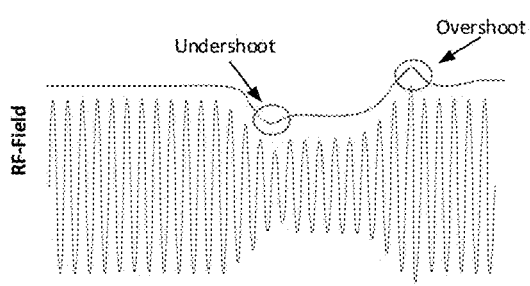
FIG. 2B shows the RF-Field nearby the antenna of the transmitter for the amplitude modulated data signal of FIG. 2A with an undershoot of the falling edge and an overshoot of the rising edge of the envelope of the RF-Field.

The transmitter 1 furthermore comprises a shape stage 16 connected to the wave generator 6 to select the waveform of the carrier signal 7 depending directly or indirectly on the data signal. In this embodiment of the invention the waveform is selected indirectly from the data signal as the encoded data signal is used. To achieve that, the shape stage 16 is connected to the encoder stage 13 and receives the encoded data signal 14 at the same time when it is provided to the modulation stage 15. The shape stage 16 therefor has the information when a rising or falling edge of the amplitude modulated data signal 2 shall occur. FIG. 5A shows the amplitude modulated data signal 2 at Tx-Pins Tx that at a time instance t1 comprises a falling edge. FIG. 5B shows the RF-Field generated by antenna 11 which RF-Field at time instance t2 would comprise an undershoot, if a transmitter know in the state of the art would be used as shown in FIG. 2B. To avoid that undershoot, the shape stage 16 is built to select another waveform in a second time frame after time instance t1 and shortly before the time instance t2 to provide more energy to the RF-Field 3. Such other waveforms to be selected by the shape stage 16 are stored in shape configuration stage 17, which stores waveforms with higher and lower energy content than the sinus waveform. A square waveform comprises more energy in the signal than the sinus waveform and the shape stage 16 selects a square waveform to replace one single sinus wave of the carrier signal 7 by one single square wave to avoid the undershoot in the envelope 18 of the amplitude modulated data signal 3 as shown in FIG. 5B.

FIG. 5A furthermore shows that the amplitude modulated data signal 2 at Tx-Pins Tx at time instance t3 comprises a rising edge. FIG. 5B shows that the RF-Field at time instance t4 comprises as little overshoot that would be much higher, if a transmitter know in the state of the art would have been used, as shown in FIG. 2B. To reduce or even avoid that overshoot, shape stage 16 is built to select another waveform in a first time frame after time instance t3 and shortly before the time instance t4 to provide less energy to the RF-Field 3. Such other waveforms to be selected by the shape stage 16 with less energy could be a sawtooth waveform or a triangular waveform to name just two possible waveforms, which waveforms are stored as configuration data in shape configuration stage 17. In this embodiment a sawtooth waveform with less energy in the signal than the sinus waveform is selected by shape stage 16, which replaces one single sinus wave of the carrier signal 7 by one single sawtooth wave to reduce the overshoot in the envelope 18 of the amplitude modulated data signal 3 as shown in FIG. 5B. If two sinus waves would have been replaced by two sawtooth waves the little overshoot shown in FIG. 5B could be avoided completely.

Figure 3A:
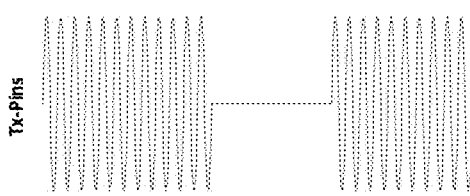
FIG. 3A shows a further example of a 100% amplitude modulated data signal on Tx-Pins of a state of the art transmitter which Tx-Pins are connected via a matching circuit to the antenna to generate an RF-Field.
Figure 3B:
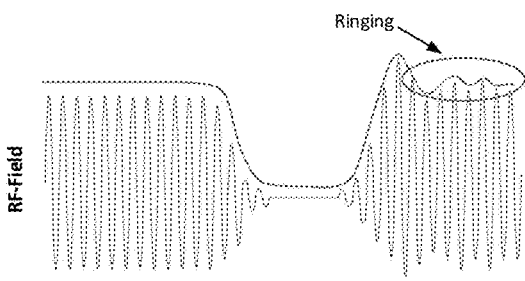
FIG. 3B shows the RF-Field nearby the antenna of the transmitter for the amplitude modulated data signal of FIG. 3A with an overshoot of the rising edge and an effect called "ringing" at the end of the rising edge of the envelope of the RF-Field.

In the same way as explained with the overshoot or the undershoot in the RF-Field 3 so called "humps" may be reduced of completely avoided when the decrease of the falling edge or the rising or rising edge of the envelope of the RF-Field 3 is not monotonically. By replacing half waves or full waves or even several waves of the sinus wave of the carrier signal 7 by a half wave or a full wave or even several waves of a signal with higher or lower energy content at the right time, distortions of the RF-Field 3 like "humps" or the "ringing" shown in FIG. 3B may be reduced or even complete avoided. This has the advantage that the amplitude modulated data signal received with the antenna of receiver 4 fully complies to the standard and may be decoded without errors, even if a metal or other object is close by and disturbs the RF-Field 3.

Such a wave generator 6 that is able to generate a sinus waveform wave by wave is known from EP 3 182 585 B1 of the same applicant. This prior art document discloses a digital power amplifier which generates a sinus wave by small increments of M digital wave-forming bits which add up increments of output current to generate a sinus wave. As an inventive improvement of this teaching all kind of other waveforms may be generated as well and a man skilled in the art will understand how to add up increments of M digital wave-forming bits to generate a triangular waveform instead of a sinus waveform. The same is true for other waveforms like the sawtooth waveform or even a rectangular waveform. The invention therefor is furthermore characterized in the inventive use of a digital power amplifier known from prior art mentioned above. The inventive use of the digital power amplifier is realized by the M digital wave-forming bits for different waveforms with higher or lower energy content in the signal wave stored in the shape configuration stage 17, which selected M digital wave-forming bits are used to steer the wave generator 6 by shape stage 16. The shape configuration stage 17 stores these M digital wave-forming bits for different waveforms in relation or combined with particular waveforms of the data signal or encoded data signal.

Figure 6A:
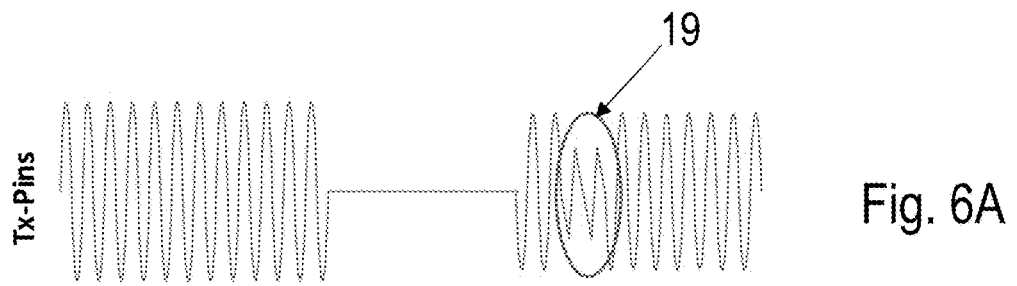
FIG. 6A shows a 100% amplitude modulated data signal on Tx-Pins of the transmitter shown in FIG. 4 with two triangular waves inserted to avoid the overshoot in the envelope of the RF-Field as shown in FIG. 6B.
Figure 6B:
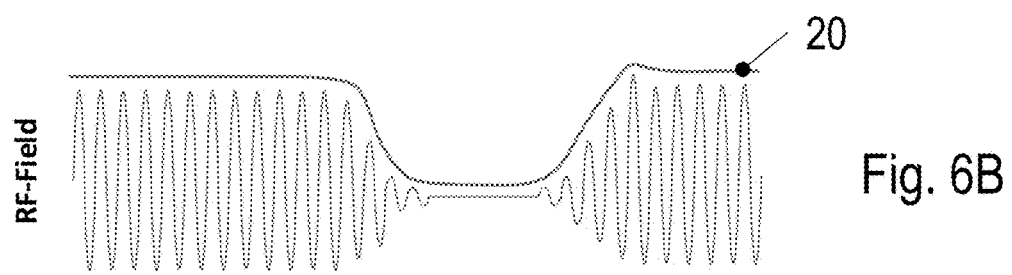

FIG. 6A shows a 100% amplitude modulated data signal on Tx-Pins Tx of the transmitter 1 shown in FIG. 4 with two triangular waves 19 inserted to avoid the overshoot in the envelope 20 of the RF-Field as shown in FIG. 6B. In this example not only the waveform has been changed from the sinus to the triangular, to reduce the energy in the carrier signal, but in addition the amplitude of the triangular waves have been reduced compared to the amplitude of the sinus waves what in addition helps to reduce the overshoot in the envelope 20 of the RF-Field. In another embodiment the amplitude of the sinus waves may be increased in addition the change to a waveform with more energy content to avoid the undershoot.

Figure 7:
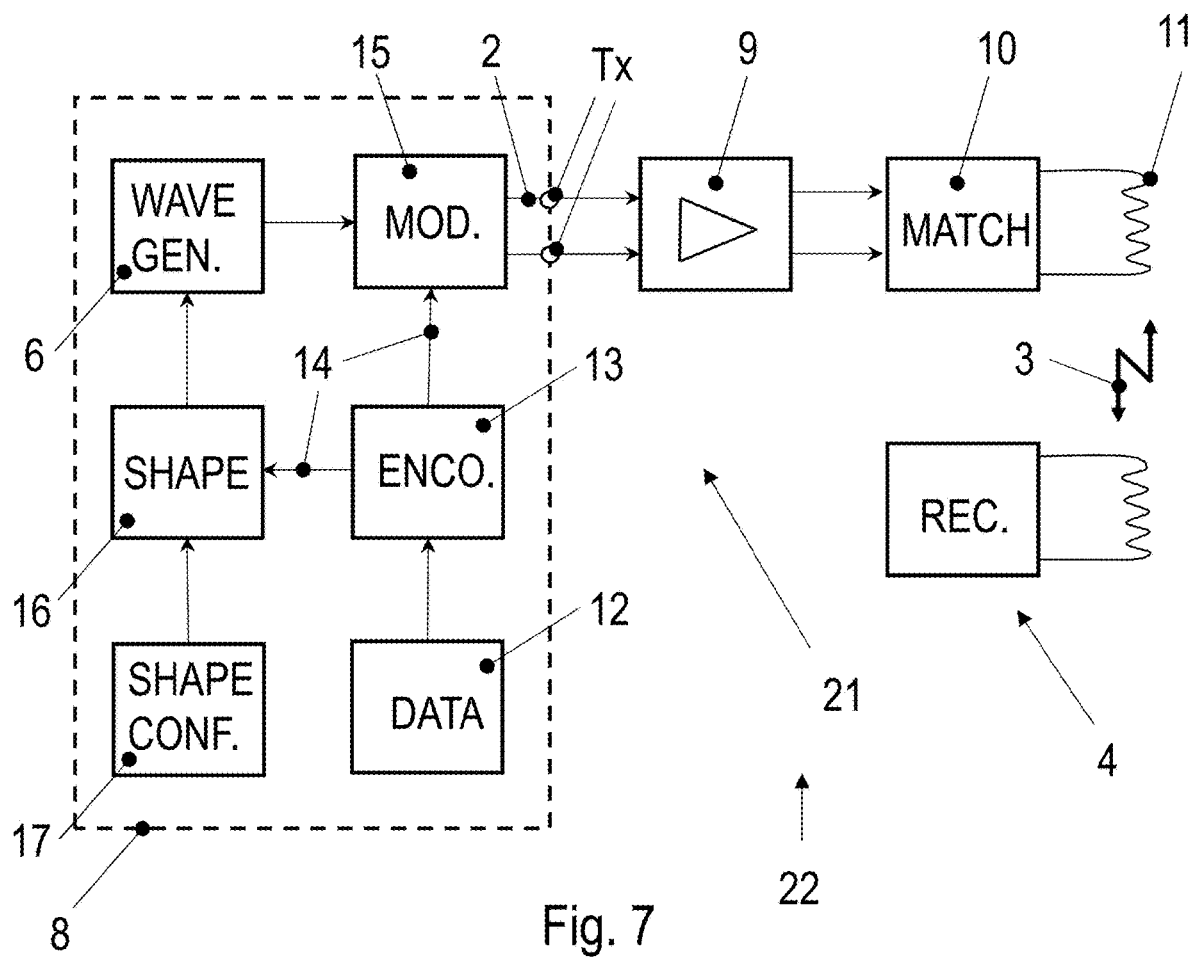
FIG. 7 shows a second embodiment of a transmitter to transmit an amplitude modulated data signal according to the invention.

FIG. 7 shows a transmitter 21 to transmit an amplitude modulated data signal 2 in an RF-Field 3 over the air to a receiver 4 of an RFID communication system 22 according to a second embodiment of the invention. The difference between transmitter 1 of the first embodiment and the transmitter 21 of the second embodiment is, that the wave generator 6 provides a carrier signal 7 with always the same amplitude and the amplitude modulation of this carrier signal 7 with the encoded data signal 14 is processed in modulation stage 15. With this slightly different arrangement, the same inventive advantages may be achieved as with the transmitter 1 according to the first embodiment of the invention. Furthermore, in this second embodiment of the invention amplifier 9 is not part of the integrated circuit 8, but realized as external amplifier 9 connected to Tx-Pins Tx.

In a third embodiment of the invention not shown in the figures the data signal is not encoded and therefore directly used to modulate the carrier signal. The shape stage therefore selects the waveform of the carrier signal depending directly on the data signal.

In a further embodiment of the invention, the wave generator could generate a sawtooth or triangular wave for the carrier signal used in general. The shape stage could in a second time frame use a sinus waveform with a higher energy content to avoid the undershoot in the envelope of the RF-Field. In another embodiment of the invention, the wave generator could generate a square wave for the carrier signal used in general and a sinus waveform or sawtooth or triangular waveform with a lower energy content to avoid the overshoot in the envelope of the RF-Field. A man skilled in the art is able to provide all kind different selections of waveforms depending on what kind of waveform is used as general waveform for the carrier signal.

In a further embodiment of the invention, a higher energy content of the carrier signal may be selected for one or several waves at the occurrence of a rising edge in the data signal or encoded data signal to reduce the time duration of the rising edge in the envelope of the RF-Field. This may cause an overshoot, what for some embodiments is not relevant, but the reduced time duration of the rising edge helps to e.g. increase the bit rate or ease the bit detection at the receiver. In a similar way, a lower energy content of the carrier signal may be selected for one or several waves at the occurrence of a falling edge in the data signal or encoded data signal to reduce the time duration of the falling edge in the envelope of the RF-Field. This may cause an undershoot, what for some embodiments is not relevant, but the reduced time duration of the falling edge helps to e.g. increase the bit rate or ease the bit detection at the receiver.

The invention claimed is:

1. A transmitter to transmit an amplitude modulated data signal in an RF-Field over the air to a receiver of an RFID communication system the transmitter comprising:
   a wave generator to generate a carrier signal with a particular frequency and waveform;
   a modulation stage to modulate the carrier signal in relation to a data signal to be transmitted;
   an antenna connected to the modulation stage or wave generator via an amplifier and a matching circuit to transmit the amplitude modulated data signal in the RF-Field over the air; and
   a shape stage connected to the wave generator to select the waveform of the carrier signal depending directly or indirectly on the data signal to be transmitted and to select in a first time frame (t3 →t4) after the rising edge of the data signal or encoded data signal during the rising edge of the envelope of the RF-Field a waveform of the carrier signal with the same frequency, but with lower energy content than outside of this first time frame (t3 >t4).

2. The transmitter according to claim 1, further comprising:
an encoder stage to encode the data signal to provide an encoded data signal to the modulation stage to modulate the carrier signal and to provide the encoded data signal to the shape stage to shape the waveform of the carrier signal in a time frame before and/or after the rising edge and/or the falling edge of the encoded data signal.

3. The transmitter according to claim 1, wherein a shape configuration stage stores configuration data with different waveforms of the carrier signal for particular waveforms of the data signal and/or the encoded data signal.

4. The transmitter according to claim 1, wherein the shape stage is configured to select a triangular or sawtooth waveform of the carrier signal within the first time frame (t3 >t4) and a sinus waveform outside of the first time frame (t3 >t4).

5. The transmitter according to claim 4, wherein the shape stage is built configured to select a square waveform of the carrier signal within the second time frame (t1 >t2) and a sinus waveform outside of the second time frame (t1 >t2).

6. The transmitter according to claim 1, wherein the wave generator is configured to generate a carrier signal with the NFC frequency of 13.56 MHz.

7. The transmitter according to claim 1, wherein the modulation stage or wave generator additionally reduces the amplitude of the data signal or encoded data signal in first time frames (t3 →t4) to avoid an overshoot in first time frames (t1 →t2) and additionally increases the amplitude of the data signal or encoded data signal in second time frames (t1 →t2) to avoid an undershoot in second time frames (t1 →t2).

8. The transmitter according to claim 1, wherein the shape stage is configured to select in a second time frame (t1 >t2) after the falling edge of the data signal or encoded data signal during the falling edge of the envelope of the RF-Field a waveform of the carrier signal with the same frequency, but with higher energy content than outside of this second time frame (t1 >t2).

9. A method for using a transmitter to transmit an amplitude modulated data signal in an RF-Field over the air to a receiver of an RFID communication system, comprising:
processing an amplitude modulation of a carrier signal with a particular frequency and waveform with a data signal or encoded data signal to be transmitted; and
selecting a waveform with higher or lower energy content of the carrier signal for one or several waves depending on the occurrence of a rising edge or falling edge in the data signal or encoded data signal to be transmitted, and
wherein a lower energy content of the carrier signal for one or several waves at the occurrence of a rising edge in the data signal or encoded data signal is selected to reduce or avoid an overshoot in the envelope of the RF-Field or, wherein a higher energy content of the carrier signal for one or several waves at the occurrence of a falling edge in the data signal or encoded data signal is selected to reduce or avoid an undershoot in the envelope of the RF-Field.

10. A method for using a transmitter to transmit an amplitude modulated data signal in an RF-Field over the air to a receiver of an RFID communication system, comprising:
processing an amplitude modulation of a carrier signal with a particular frequency and waveform with a data signal or encoded data signal to be transmitted; and
selecting a waveform with higher or lower energy content of the carrier signal for one or several waves depending on the occurrence of a rising edge or falling edge in the data signal or encoded data signal to be transmitted, and
wherein a higher energy content of the carrier signal for one or several waves at the occurrence of a rising edge in the data signal or encoded data signal is selected to reduce the time duration of the rising edge in the envelope of the RF-Field or, wherein a lower energy content of the carrier signal for one or several waves at the occurrence of a falling edge in the data signal or encoded data signal is selected to reduce the time duration of the falling edge in the envelope of the RF-Field.

11. A method for transmitting an amplitude modulated data signal in an RF-Field over the air to a receiver of an RFID communication system, comprising the steps of:
generating a carrier signal with a particular frequency and waveform;
modulating the carrier signal in relation to a data signal to be transmitted, thereby generating an amplitude modulated data signal;
transmitting the amplitude modulated data signal in the RF-Field over the air;
selecting the waveform of the carrier signal based on the data signal; and
selecting in a first time frame (t3 →t4) after the rising edge of the data signal or encoded data signal during the rising edge of the envelope of the RF-Field a waveform of the carrier signal with the same frequency, but with lower energy content than outside of this first time frame (t3 >t4).

12. The method according to claim 11, further comprising:
encoding the data signal to provide an encoded data signal to the modulation stage to modulate the carrier signal and to provide the encoded data signal to the shape stage to shape the waveform of the carrier signal in a time frame before and/or after the rising edge and/or the falling edge of the encoded data signal.

13. The method according to claim 11, further comprising:
storing configuration data with different waveforms of the carrier signal for particular waveforms of the data signal and/or the encoded data signal.

14. The method according to claim 11, further comprising:
selecting a triangular or sawtooth waveform of the carrier signal within the first time frame (t3 >t4) and a sinus waveform outside of the first time frame (t3 >t4).

15. The method according to claim 14, further comprising:
selecting a square waveform of the carrier signal within the second time frame (t1 >t2) and a sinus waveform outside of the second time frame (t1 >t2).

16. The method according to claim 11, further comprising:
generating a carrier signal with the NFC frequency of 13.56 MHz.

17. The method according to claim 11,
reducing the amplitude of the data signal or encoded data signal in first time frames (t3 →t4) to avoid an overshoot in first time frames (t1 →t2); and
increasing the amplitude of the data signal or encoded data signal in second time frames (t1 →t2) to avoid an undershoot in second time frames (t1 →t2).

18. The method according to claim 11, further comprising:
  selecting in a second time frame (t1 >t2) after the falling edge of the data signal or encoded data signal during the falling edge of the envelope of the RF-Field a waveform of the carrier signal with the same frequency, but with higher energy content than outside of this second time frame (t1 >t2).

\* \* \* \* \*